US012240386B2

(12) United States Patent
Varekar et al.

(10) Patent No.: US 12,240,386 B2
(45) Date of Patent: Mar. 4, 2025

(54) VEHICLE SENSING SYSTEM WITH ENHANCED OBSTACLE DETECTION FORWARD AND SIDEWARD OF THE VEHICLE

(71) Applicant: Magna Electronics Inc., Auburn Hills, MI (US)

(72) Inventors: Akshay Varekar, Pune (IN); Kushal Sachdev, Pune (IN)

(73) Assignee: Magna Electronics Inc., Auburn Hills, MI (US)

( * ) Notice: Subject to any disclaimer, the term of this patent is extended or adjusted under 35 U.S.C. 154(b) by 49 days.

(21) Appl. No.: 18/299,087

(22) Filed: Apr. 12, 2023

(65) Prior Publication Data

US 2023/0331161 A1 Oct. 19, 2023

Related U.S. Application Data

(60) Provisional application No. 63/362,904, filed on Apr. 13, 2022.

(51) Int. Cl.
| | |
|---|---|
| *B60R 1/26* | (2022.01) |
| *B60K 35/00* | (2024.01) |
| *B60K 35/10* | (2024.01) |
| *B60K 35/28* | (2024.01) |

(52) U.S. Cl.
CPC ............. *B60R 1/26* (2022.01); *B60K 35/00* (2013.01); *B60K 35/10* (2024.01); *B60K 35/28* (2024.01); *B60K 2360/119* (2024.01); *B60K 2360/176* (2024.01); *B60R 2300/806* (2013.01); *B60R 2300/8093* (2013.01)

(58) Field of Classification Search
CPC ............. B60R 1/26; B60R 2300/806; B60R 2300/8093; B60R 1/00; B60K 35/00; B60K 35/10; B60K 35/28; B60K 2360/119; B60K 2360/176
See application file for complete search history.

(56) References Cited

U.S. PATENT DOCUMENTS

| | | |
|---|---|---|
| 4,546,551 A | 10/1985 | Franks |
| 4,953,305 A | 9/1990 | Van Lente et al. |
| 5,530,240 A | 6/1996 | Larson et al. |
| 5,550,677 A | 8/1996 | Schofield et al. |
| 5,576,687 A | 11/1996 | Blank et al. |
| 5,632,092 A | 5/1997 | Blank et al. |
| 5,668,663 A | 9/1997 | Varaprasad et al. |
| 5,670,935 A | 9/1997 | Schofield et al. |

(Continued)

*Primary Examiner* — Michael Lee
(74) *Attorney, Agent, or Firm* — HONIGMAN LLP

(57) ABSTRACT

A vehicular vision system includes a camera disposed at a vehicle and viewing exterior of the vehicle. The vehicular vision system, responsive to detecting an object present exterior of the vehicle via processing of image data captured by the camera, determines location of the detected object relative to the vehicle. The vehicular vision system displays video images derived from the captured image data on a video display. The vehicular vision system generates a three-dimensional (3D) icon that includes a front face and a rear face opposing the front face with a length dimension between the faces. The 3D icon overlays the detected object and the front face faces toward a representation of the vehicle. Responsive to a chance in location of the object relative to the vehicle, the system adjusts the length dimension.

25 Claims, 12 Drawing Sheets

(56) References Cited

U.S. PATENT DOCUMENTS

| | | |
|---|---|---|
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |
| 5,802,727 A | 9/1998 | Blank et al. |
| 5,878,370 A | 3/1999 | Olson |
| 5,949,331 A | 9/1999 | Schofield et al. |
| 6,087,953 A | 7/2000 | DeLine et al. |
| 6,173,501 B1 | 1/2001 | Blank et al. |
| 6,222,460 B1 | 4/2001 | DeLine et al. |
| 6,329,925 B1 | 12/2001 | Skiver et al. |
| 6,513,252 B1 | 2/2003 | Schierbeek et al. |
| 6,642,851 B2 | 11/2003 | Deline et al. |
| 6,690,268 B2 | 2/2004 | Schofield et al. |
| 7,004,593 B2 | 2/2006 | Weller et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,855,755 B2 | 12/2010 | Weller et al. |
| 8,451,107 B2 | 5/2013 | Lu et al. |
| 9,041,806 B2 | 5/2015 | Baur et al. |
| 9,126,525 B2 | 9/2015 | Lynam et al. |
| 9,264,672 B2 | 2/2016 | Lynam |
| 9,446,713 B2 | 9/2016 | Lu et al. |
| 9,495,876 B2 | 11/2016 | Lu et al. |
| 9,558,409 B2 | 1/2017 | Pliefke et al. |
| 9,596,387 B2 | 3/2017 | Achenbach et al. |
| 9,723,272 B2 | 8/2017 | Lu et al. |
| 9,762,880 B2 | 9/2017 | Pflug |
| 9,834,153 B2 | 12/2017 | Gupta et al. |
| 9,900,522 B2 | 2/2018 | Lu |
| 10,046,706 B2 | 8/2018 | Larson et al. |
| 10,071,687 B2 | 9/2018 | Ihlenburg et al. |
| 10,099,614 B2 | 10/2018 | Diessner |
| 10,442,360 B2 | 10/2019 | LaCross et al. |
| 10,457,209 B2 | 10/2019 | Byrne et al. |
| 11,498,494 B2 | 11/2022 | Lynam et al. |
| 2010/0265048 A1* | 10/2010 | Lu .................. B60R 1/26 340/435 |
| 2012/0162427 A1 | 6/2012 | Lynam |
| 2014/0022390 A1 | 1/2014 | Blank et al. |
| 2015/0022664 A1 | 1/2015 | Pflug et al. |
| 2016/0203629 A1* | 7/2016 | Takeda ............ B60R 1/24 345/632 |
| 2017/0187963 A1* | 6/2017 | Lee .................. G01C 21/365 |
| 2018/0066956 A1* | 3/2018 | Kim .................. G01C 21/3682 |
| 2019/0118717 A1 | 4/2019 | Blank et al. |
| 2021/0162926 A1 | 6/2021 | Lu |
| 2021/0245662 A1 | 8/2021 | Blank et al. |
| 2021/0326602 A1* | 10/2021 | Rasmusson ...... G05D 1/0246 |
| 2024/0064274 A1 | 2/2024 | Blank et al. |

* cited by examiner

| S.no | Obstacle Detection | Colour of Cube |
|---|---|---|
| 1 | Far distance objects | Green |
| 2 | Near distance objects | Yellow |
| 3 | Very close objects | Red |

| Dynamic Guidelines Overlays | | Dimensions |
|---|---|---|
| Distance to First Marker | 1 | 1650mm |
| Distance to Second Marker | 2 | 3150mm |
| Distance to Third marker | 3 | 4650mm |
| Overall Length | 4 | 6500mm |
| width of Vehicle width trajectory | 5 | 50mm |
| width of Road Wheel trajectory (Road Wheel) | 6 | 260mm |
| End marker width | 7 | 50mm |
| End marker length | 8 | 700mm |
| Distance between Road Wheel trajectory (Wheel Lateral Distance inside) | 9 | 1430mm |
| Overall width (car width including mirrors + (2*40 mm)) | 10 | 2200mm |
| Hidden area width | 11 | 100mm |
| Length of Horizontal Line (Wheel Lateral Distance inside +(2*Tyre width)) | 12 | 1950mm |
| Width of Horizontal Line | 13 | 50mm |
| Border width of Road Wheel trajectory | B.2 | 35mm |
| Dynamic Guidelines Overlays | | RGB Value |
| Color of Vehicle width trajectory | A | 180,255,0 |
| Color of Road Wheel trajectory | B | 180,255,0 |
| Color of First End Marker | C | 180,255,0 |
| Color of second End Marker | D | 180,255,0 |
| Color of third End Marker | E | 180,255,0 |
| Color of Horizontal Line | F | 250,10,0 |
| Dynamic Guidelines Overlays | | Value |
| Opaqueness of Vehicle width trajectory | A | 70% |
| Opaqueness of inside part of Road Wheel trajectory | B.1 | 50% |
| Opaqueness of Border of Road Wheel trajectory | B.2 | 70% |
| Opaqueness of End Marker | C,D,E | 70% |
| Opaqueness of Horizontal Line | F | 100% |

FIG. 12

VEHICLE SENSING SYSTEM WITH ENHANCED OBSTACLE DETECTION FORWARD AND SIDEWARD OF THE VEHICLE

CROSS REFERENCE TO RELATED APPLICATION

The present application claims the filing benefits of U.S. provisional application Ser. No. 63/362,904, filed Apr. 13, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes a camera disposed at a vehicle equipped with the vehicular vision system. The camera views exterior of the equipped vehicle and is operable to capture image data. The camera includes a CMOS imaging array that may include at least one million photosensors arranged in rows and columns. The system includes an electronic control unit (ECU) with electronic circuitry and associated software. The electronic circuitry of the ECU includes an image processor for processing image data captured by the camera. A video display is disposed in the equipped vehicle and operable to display video images derived from image data captured by the camera. During a driving maneuver, the vehicular vision system displays video images derived from the captured image data on the video display. Also during the driving maneuver, the vehicular vision system, at least in part via processing at the ECU of image data captured by the camera, detects an object present exterior of the equipped vehicle.

The vehicular vision system, responsive to detecting the object present exterior of the equipped vehicle, determines a location of the detected object relative to the equipped vehicle and determines a portion of the detected object that is closest to the equipped vehicle. The vehicular vision system generates a graphic overlay that includes a three-dimensional (3D) icon. The 3D icon includes a width and a height defining a front face of the 3D icon and a rear face opposing the front face. The 3D icon has a length dimension between the front face and the rear face. The vehicular vision system displays the graphic overlay with the displayed video images on the video display and the 3D icon overlays the portion of the detected object that is closest to the equipped vehicle. The front face of the overlaid 3D icon faces toward a representation of the equipped vehicle displayed on the video display. The vehicular vision system, responsive to determining a change in location of the detected object relative to the equipped vehicle, adjusts the length dimension of the 3D icon overlaid at the portion of the detected object based on the determined change in location of the detected object.

These and other objects, advantages, purposes and features of the present invention will become apparent upon review of the following specification in conjunction with the drawings.

BRIEF DESCRIPTION OF THE DRAWINGS

FIG. 12 is a table of dimensions and values of the dynamic graphic overlay.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like. As discussed below, the system is configured to provide an enhanced surround view display that visually indicates proximity of a detected object from the vehicle, such as by visually representing the detected object at the screen as a floating wall or other graphical icon. Optionally, the system may provide dynamic guidelines to visually represent a trajectory of the vehicle along its path of movement, such as by indicating a vehicle width trajectory, a road wheel trajectory, and one or more marker lines. Thus, the system improves the ability of the driver to quickly understand the proximity of objects relative to the vehicle as the driver maneuvers the vehicle within the environment.

Figure 1:
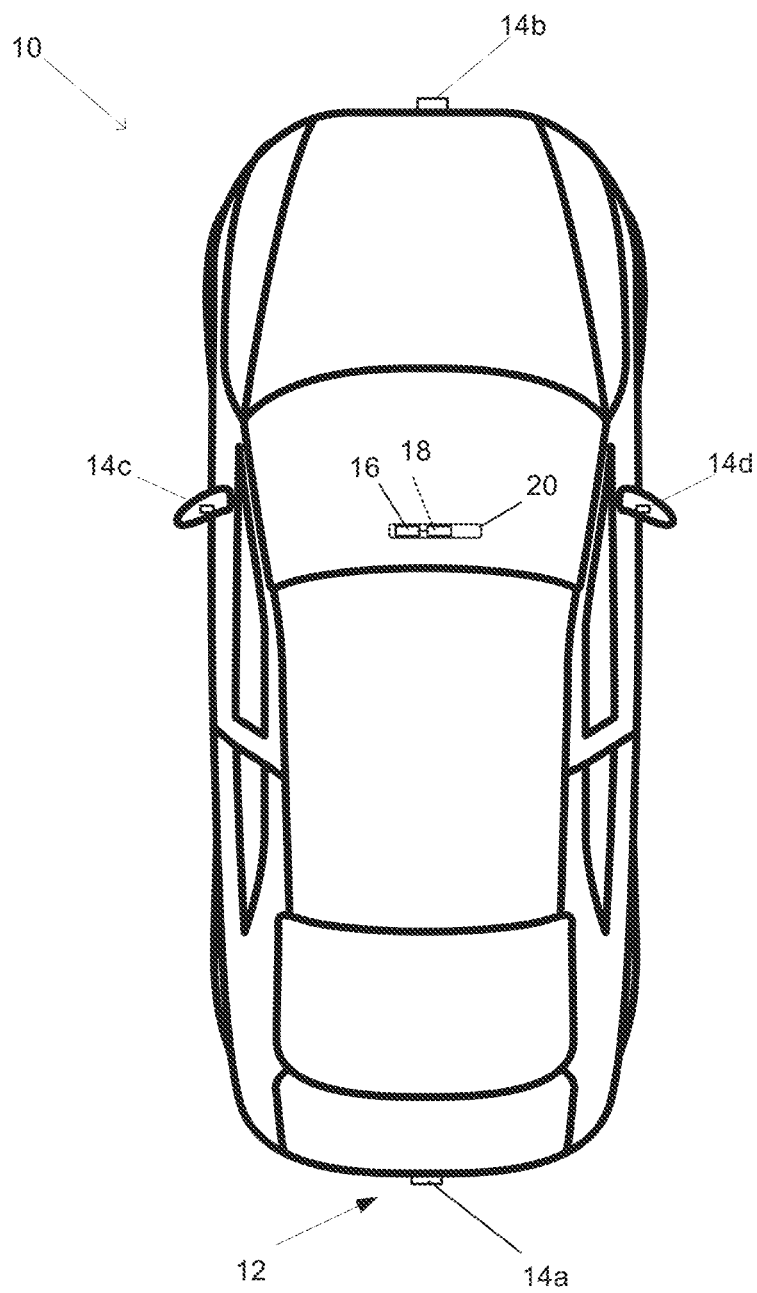
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Many driver assist systems or vehicular vision systems or vehicular display systems may, based on various configurations, user preferences, environmental conditions, and vehicle inputs, overlay graphics on images (e.g., images derived from image data captured by one or more cameras 14a-d of the vehicle) displayed on the display 16 for the driver or other occupants to view. These overlays can be complex static or dynamic graphics that are drawn or superimposed over the image data captured by a camera or other imaging sensor. For example, a rear backup system may display images captured by a rear backup camera while the vehicle is reversing, and the rear backup system may overlay graphics that indicate a current or predicted path of the vehicle based on the current steering angle. Other examples include, but are not limited to, overlaying geographic information, traffic or traffic lane information, and weather condition information. These graphics can be made up of several different elements or portions.

The system 12 processes the image data captured by the one or more cameras at the vehicle to detect objects and provide the display at the display device 16 for viewing by the driver of the vehicle. The system 12 may be configured to provide a variety of different views, such as a view rearward of the vehicle, a view forward of the vehicle, respective views at least sideward of the vehicle, and/or surround or top down or bird's eye views of the vehicle. Further, the system 12 may process the image data to provide views at the display screen 16 that include the graphical overlays or other image enhancements.

Thus, the ECU may receive image data from the one or more cameras at the vehicle and process the image data to determine presence of objects in the field of view of the camera and provide video images derived from the image data at the display screen. The ECU generates a graphic overlay and displays the graphic overlay with the displayed video images at the video display. The graphic overlay may be superimposed or overlaid on a single image or multiple images (i.e., video images) derived from image data captured by an image sensor. The graphic overlay may be generated responsive to a user input (such as by placing the vehicle in a specific gear or by selecting a button or knob) or responsive to the determination of presence of an object in the field of view of the camera and may be representative of the determined position of the object relative to the vehicle. The graphic overlay may include an icon, such as a cuboid (i.e., a floating wall) or other three-dimensional (3D) shape that is representative of the position of the object relative to the vehicle. That is, the graphic overlay may provide a floating wall detection feature to alert the driver regarding nearby obstacles based on their proximity. The graphic overlay may also include a dynamic guideline representative of a path of travel of the vehicle. The dynamic floating walls allow the driver to ascertain the object's distance from the vehicle quickly (e.g., at a glance).

Figure 2:
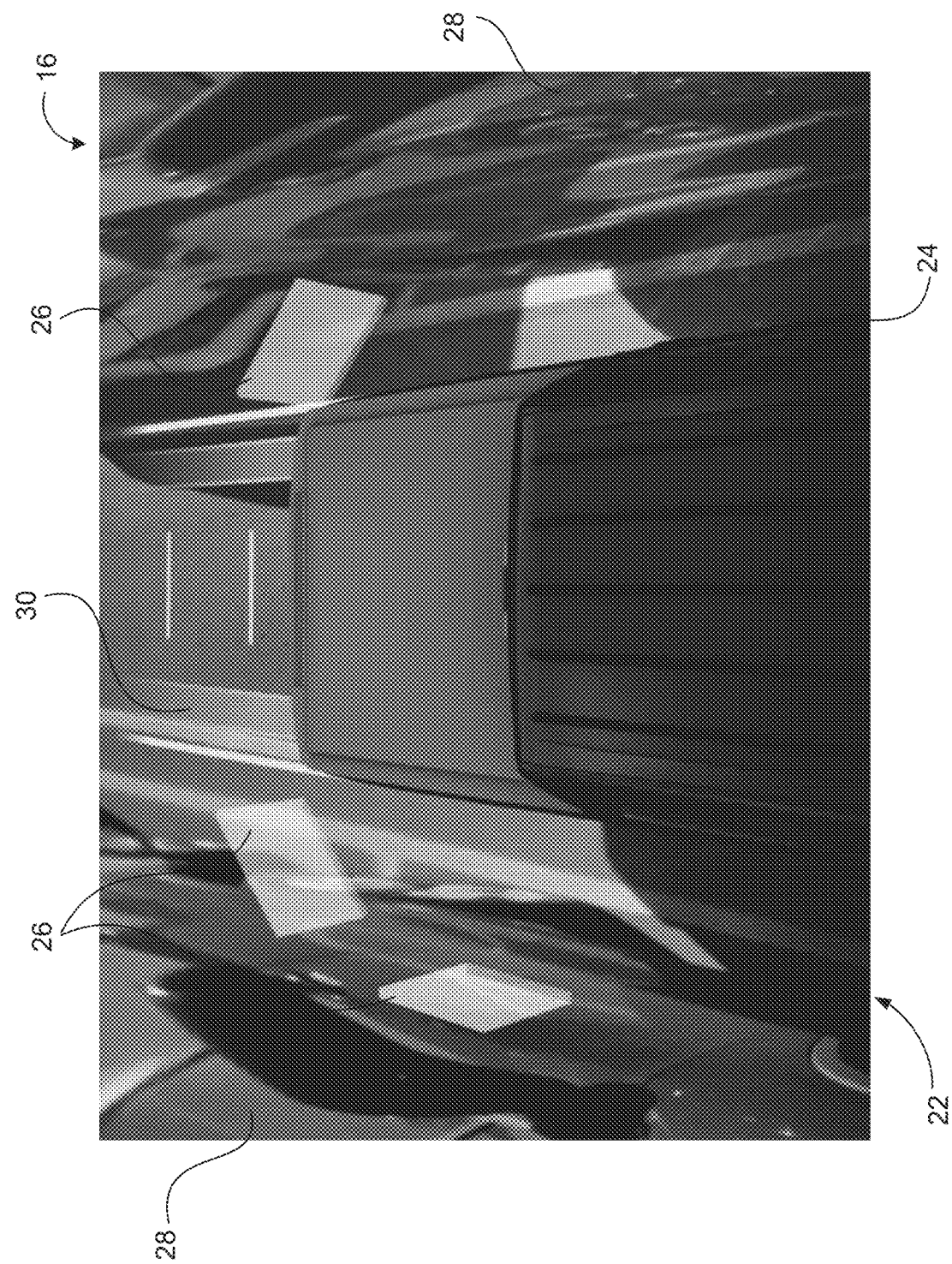
FIG. 2 is a view of a video display of the vision system displaying a video image derived from captured image data and a graphic overlay representative of positions of detected objects relative to the vehicle and representative of a path of travel of the vehicle.

For example, and as shown in FIG. 2, the display device 16 may show video images 22 of the environment surrounding the vehicle, a three-dimensional (3D) representation 24 of the vehicle (e.g., a vehicle avatar representing the vehicle and/or video images derived from image data captured by one or more cameras representing a portion of the vehicle that is in a field of view of the one or more cameras), and graphical icons 26 indicating the locations of detected objects 28 relative to the vehicle. The graphical overlay may include a guideline 30 representative of a current trajectory or path of movement of the vehicle within the environment (e.g., based on a current steering angle and speed of the vehicle). In other words, the display (i.e., the images that may be shown at the display device 16 and viewed by the driver of the vehicle 10) includes video images 22 representative of image data captured by one or more cameras at the vehicle 10, the 3D representation 24 of the vehicle, graphical icons 26 representative of the position of objects 30 relative to the vehicle, and/or a guideline 30 representative of a path of travel of the vehicle. In the example of FIG. 2, the objects 30 are portions of other vehicle adjacent the equipped vehicle, but the objects may be anything in the vicinity of the vehicle (e.g., pedestrians, bicycles, trees, walls, pillars, curbs, etc.).

When displaying images at the display 16, the system 12 may default to only displaying video images derived from the captured image data (i.e., with no overlay) and, responsive to determination of an object in proximity to the vehicle or a user input and within the field of view of the camera(s), the system may display the graphic overlay with the displayed video images on the display 16. The position, color, size, brightness, and/or shape of the graphic overlay relative to the displayed video images may be representative of the position of the detected object relative to the vehicle so that the driver may better understand the position of the object while maneuvering the vehicle.

Figure 3:
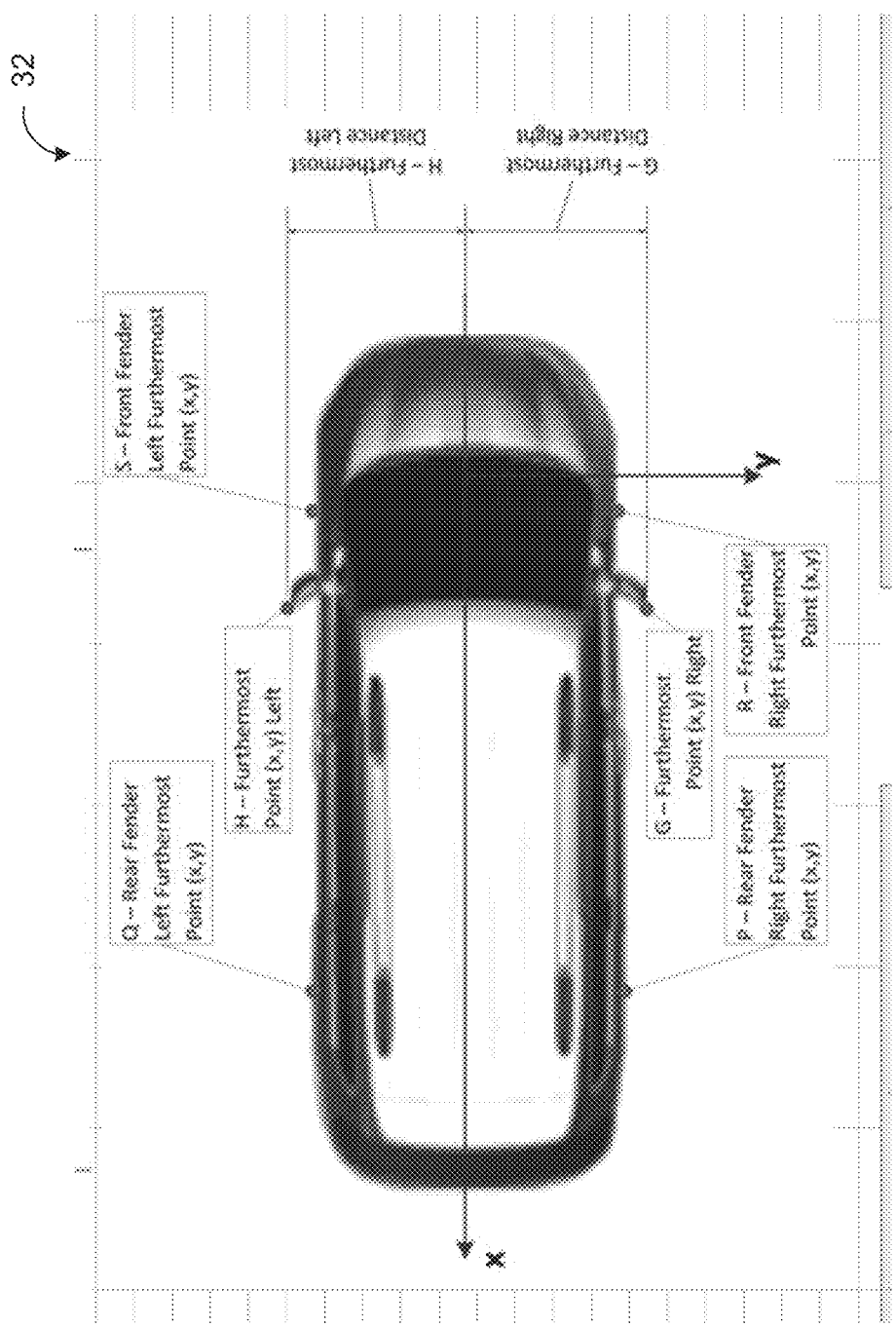
FIG. 3 is a schematic view of a coordinate system for determining the positions of detected objects relative to the vehicle.

As shown in FIG. 3, the system may utilize a coordinate system 32 to determine a position of the detected object relative to the vehicle and translate the position in the environment to a position of the graphic overlay at the display 16. The coordinate system 32 may identify the x and y positions (i.e., Cartesian coordinates) of the detected object relative to one or more positions on the vehicle, where the x axis represents a longitudinal axis of the vehicle along a length of the vehicle and the y axis is perpendicular to the x axis along a width of the vehicle. The reference positions may include the furthest most point on the driver side of the vehicle (i.e., the position of the vehicle furthest from the x axis) and the furthest most point on the passenger side of the vehicle, such as the respective exterior rearview mirrors. The reference positions may further include the furthest most points of the rear and front fenders along the driver and passenger sides of the vehicle (e.g. the bumpers/fenders of the vehicle). The reference positions may correspond to positions of sensors (e.g., proximity sensors such as ultrasonic sensors) or known positions of the vehicle relative to sensors.

Figure 4:
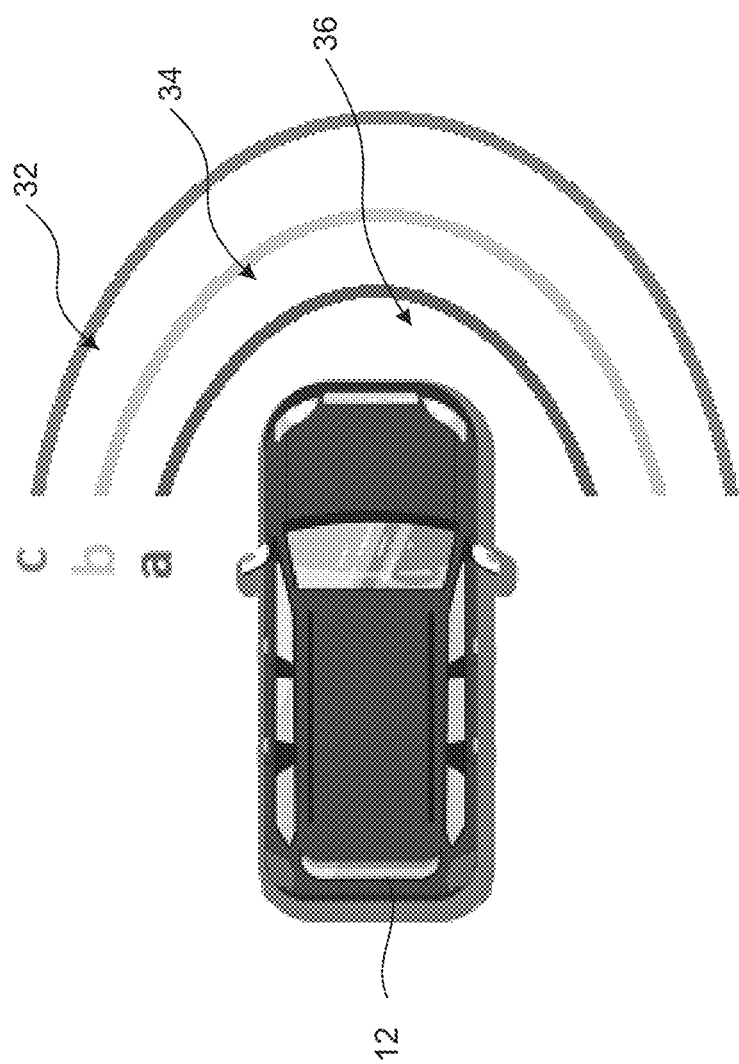
FIG. 4 is a plan view of the vehicle showing distance ranges of a plurality of zones used to categorize detected objects based on their proximity to the vehicle.

As shown in FIG. 4, the system 12 may determine the position of the detected object relative to one or more proximity zones. Each proximity zone defines a range of distances from the vehicle. For example, one proximity zone may represent distances less than one foot from the vehicle, while another proximity zone may define distances greater than one foot but less than three feet from the vehicle. In other words, each proximity zone has an upper boundary or threshold distance relative to the vehicle and a lower boundary or threshold distance relative to the vehicle. The position of the detected object within a given proximity zone may determine how the system represents the object in the graphic overlay. When a detected object is determined to be at a distance from the vehicle that falls between thresholds of a given proximity zone, the object is determined to be within that particular proximity zone. The system may implement any number of zones at any level of granularity. The distance between the detected object and the vehicle may be determined based on processing image data (e.g., captured by a camera) or based on processing sensor data from another sensor at the vehicle, such as radar sensors, lidar sensors, ultrasonic sensors, or the like.

That is, for indicating the proximity of the object with respect to the vehicle, the system considers a number (such as three, five, seven, etc.) virtual zones (e.g., curved lines at a fixed distance around the vehicle establishing the proximity zones). These lines/proximity zones may not be displayed to the driver, but instead used for determining the object proximity from the vehicle. Based on the distance of an object from the vehicle, the system categorizes the object according to the respective proximity zone.

In the illustrated embodiment of FIG. 4, the system 12 determines whether the object is in one of three zones, where the illustrated boundaries represent the upper bound or greater threshold distance for the respective zone. Thus, there is a furthest zone 32 (between the bounds labeled "c" and "b") from the vehicle, a middle zone 34 (between the bounds labeled "b" and "a") from the vehicle, and a nearest zone 36 (between the bound labeled "a" and the vehicle) from the vehicle. Objects determined to be at a distance further from the vehicle than the furthest threshold distance (the bound labeled "c") may not be represented by the graphic overlay. That is, these objects may be sufficient distance from the vehicle to not be an immediate threat. Optionally, the distance between the equipped vehicle and the detected object is the distance between a portion of the detected object that is closest to the equipped vehicle and the equipped vehicle. The distances between the vehicle and the respective bounds of the proximity zones may be any suitable distance and may be configurable by a user of the vehicle. The distances may be dynamic (e.g., based on a speed of the vehicle, based on environmental factors around the vehicle such as weather, etc.). For example, the proximity zones may be larger and extend further from the vehicle the faster the vehicle is moving. That is, the proximity zones may be "fixed" and represent absolute distances from the vehicle or dynamic and represent relative distances from the vehicle (e.g., each zone represent a distance the vehicle will travel in a fixed amount of time at the current speed).

Once the objects are detected and categorized, an alert may be shown to the driver by way of the graphic overlay. For example, the alert may be shown when one or more objects are detected within a threshold distance of the vehicle. Other conditions may need to be satisfied before displaying the alert. For example, the vehicle may need to be in a certain gear (e.g., not in park), be moving or having been moving within a threshold period of time, etc. The graphic overlay includes the icon 26 representative of the object in the environment and may position and orient or configure the icon 26 within the video images to assist the driver in understanding the position and proximity of the object relative to the vehicle. Thus, the displayed position of the icon 26 at the video images may correspond to the determined position of the object relative to the vehicle. For example, in FIG. 2, the detected objects are detected alongside the vehicle and thus are positioned to the sides and angled relative to the 3D representation 24 of the vehicle based on the position of the objects and the direction of travel of the vehicle. The icons 26 may represent a position where the object and the vehicle may collide.

Figure 5:
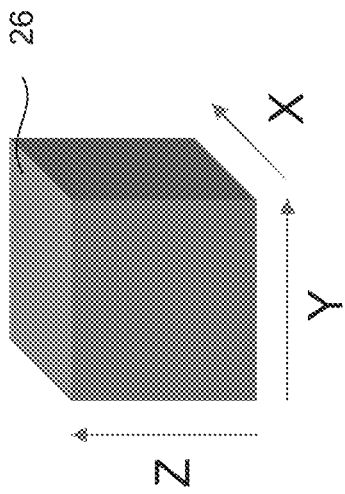
FIG. 5 is a schematic view of an icon used to represent an object in the environment about the vehicle using the vision system of FIG. 1.

The icon 26 may be any suitable configuration and one or more characteristics of the icon 26 may correspond to features or information regarding the detected object. As shown in FIG. 5, the icon may be a 3D icon, such as a cube or box or cuboid or floating wall, having a length, a width, and height measured along respective x, y, and z axes respectively. The color of the icon and its length along the icon's x axis may represent the proximity of the object to the vehicle. For example, objects in the furthest zone 32 (i.e., far distance objects) may be represented by a thick green cuboid, objects in the middle zone 34 (i.e., near distance objects) may be represented by a relatively thinner yellow cuboid, and objects in the nearest zone 36 (i.e., very close objects) may be represented by a thin red cuboid (i.e., thinner than the green and yellow cuboids).

Responsive to determining a change in the position of the detected object relative to the vehicle (i.e., the object is closer or further from the vehicle), the system optionally adjusts the graphic overlay based on the determined change. The system may adjust one or more characteristics of the icon 26 based on the determined change. Optionally, a thickness of the icon changes based on the distance between the object and the vehicle. The icon may have a front face nearest to the vehicle defined by a width and a height (i.e., the y and z axes) and a length (i.e., the x axis) that separates the front face from a rear face of the icon. The length, the height, and/or the width of the icon may be adjusted as the distance between the vehicle and the object changes. For example, as the object moves closer and closer to the vehicle, the length of the icon may decrease along the x axis (i.e., become thinner) and at the closest distance the length (i.e., the distance along the x-axis or along the axis extending from the vehicle and through the icon) may become zero. In other words, at a minimum distance, the object is represented by a flat two dimensional (2D) wall/rectangle or other shape. In contrast, the length of the icon (e.g., a cuboid) increases along the x axis as the object is gets further away from the vehicle.

Figure 6:
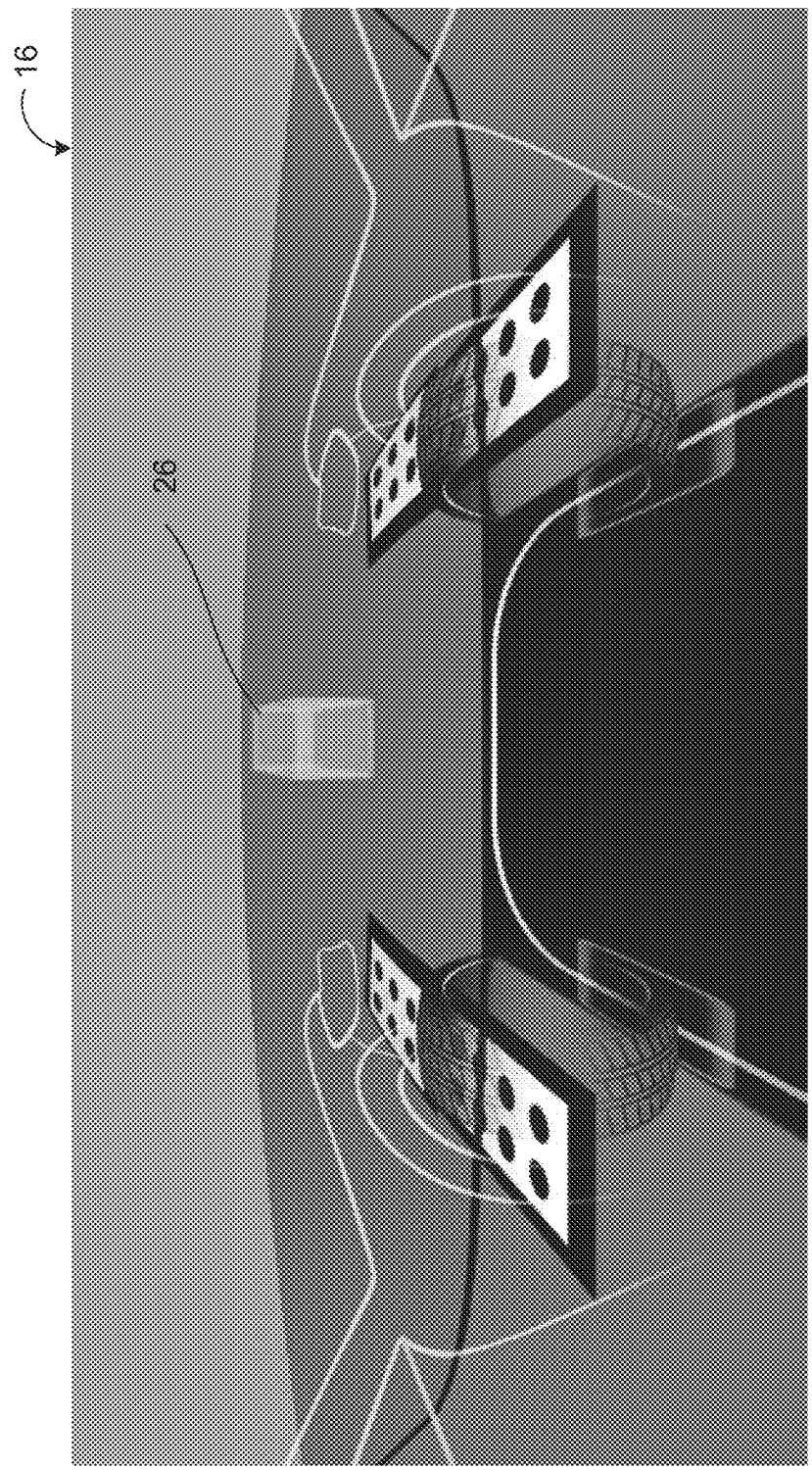
FIGS. 6-8 are views of video images on a video display showing a graphical overlay including icons representative of objects in various proximity zones relative to the vehicle.
Figure 7:
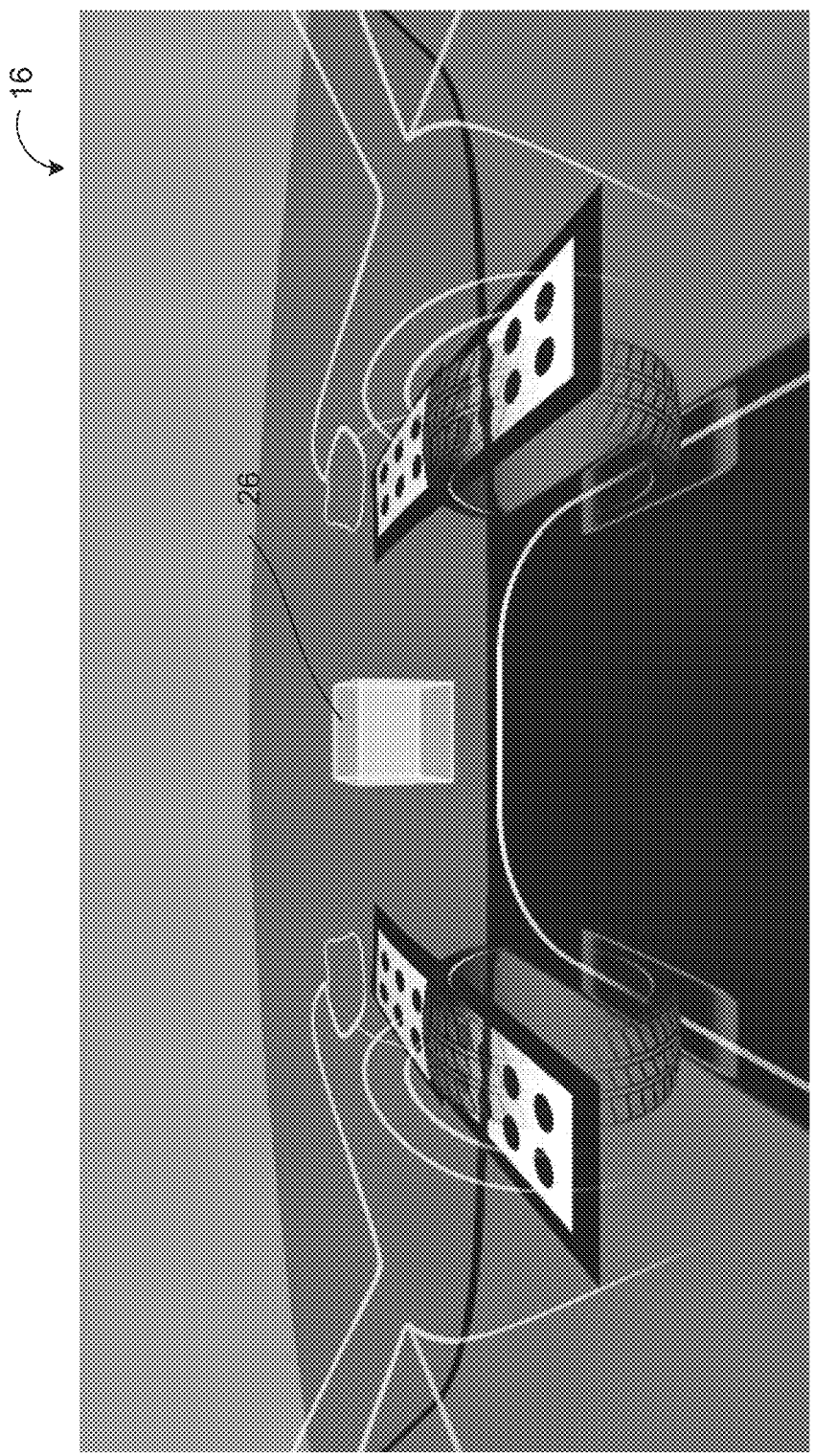
Figure 8:
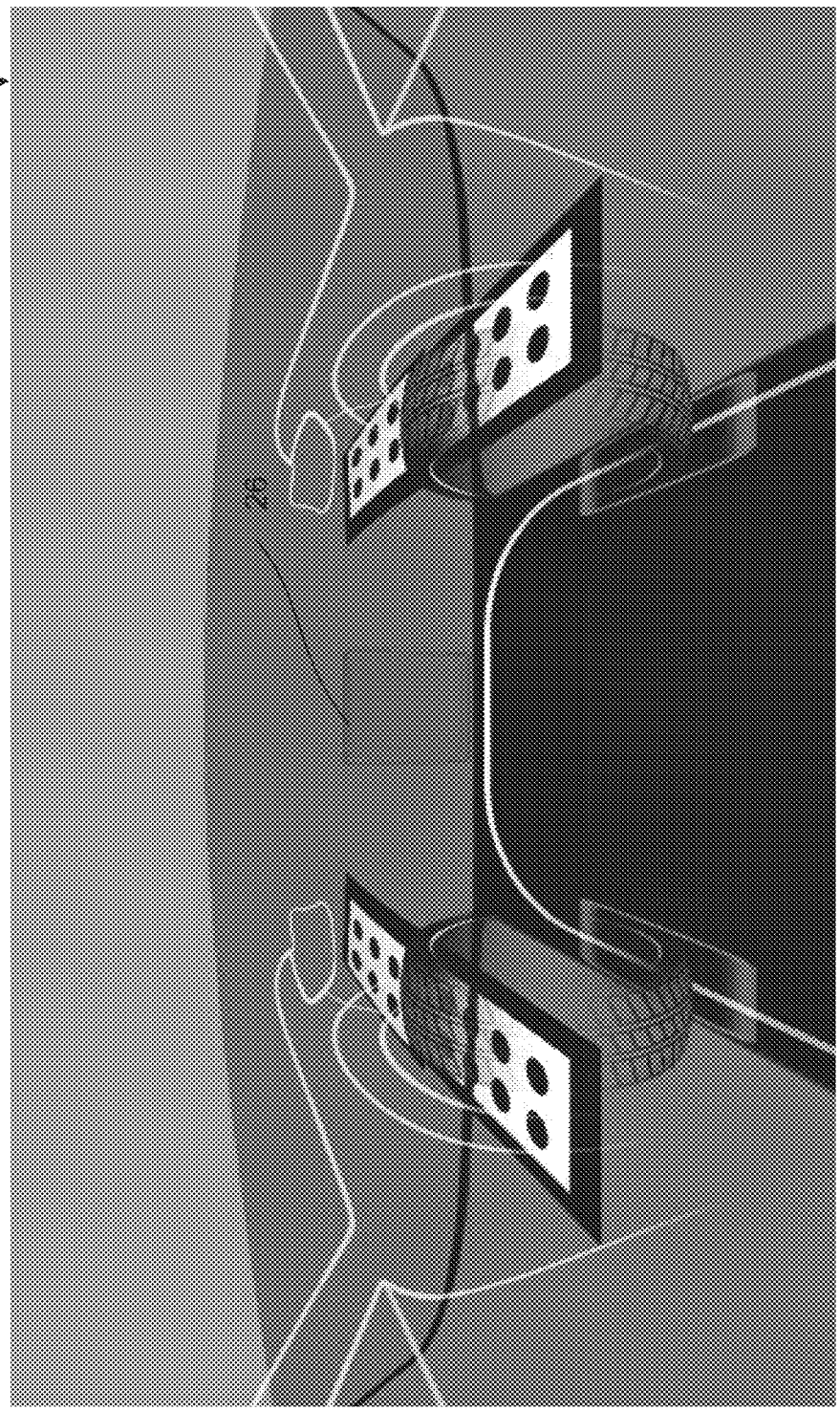

As shown in FIGS. 6-8, the system 12 may dynamically adjust the graphic overlay based on changes in position of the detected object relative to the vehicle by adjusting characteristics of the icon 26 based on the position of the object relative to the vehicle and the categorized zone of the object (e.g., as the vehicle and/or the objects move about the environment). In FIG. 6, the detected object is determined to be in the furthest zone 32 (FIG. 4) so the object is represented by a green color cuboid 26 and the length of the cuboid along its x axis is at a maximum (i.e., the cuboid is thick). In FIG. 7, the vehicle and the detected object are closer in proximity so that the object is now in the middle zone 34. Thus, in this example, the graphic overlay at the display 16 represents the object as a yellow color cuboid 26 and the length of the cuboid along its x axis varies between the lengths of objects in the furthest zone 32 and the length of objects in the nearest zone 36. In FIG. 8, the vehicle and the detected object are even closer in proximity so that the object is in the nearest zone 32. Here, the graphic overlay at the display 16 represents the object as a red color cuboid 26 and the length of the cuboid along its x axis is at a minimum. In this example, the icon 26 is nearly 2D when the detected object is in close proximity to the vehicle. It is understood that any colors (or other effects in addition to or alternative to color, such as patterns, gradients, shapes, transparency, etc.) may be used.

Figure 9:
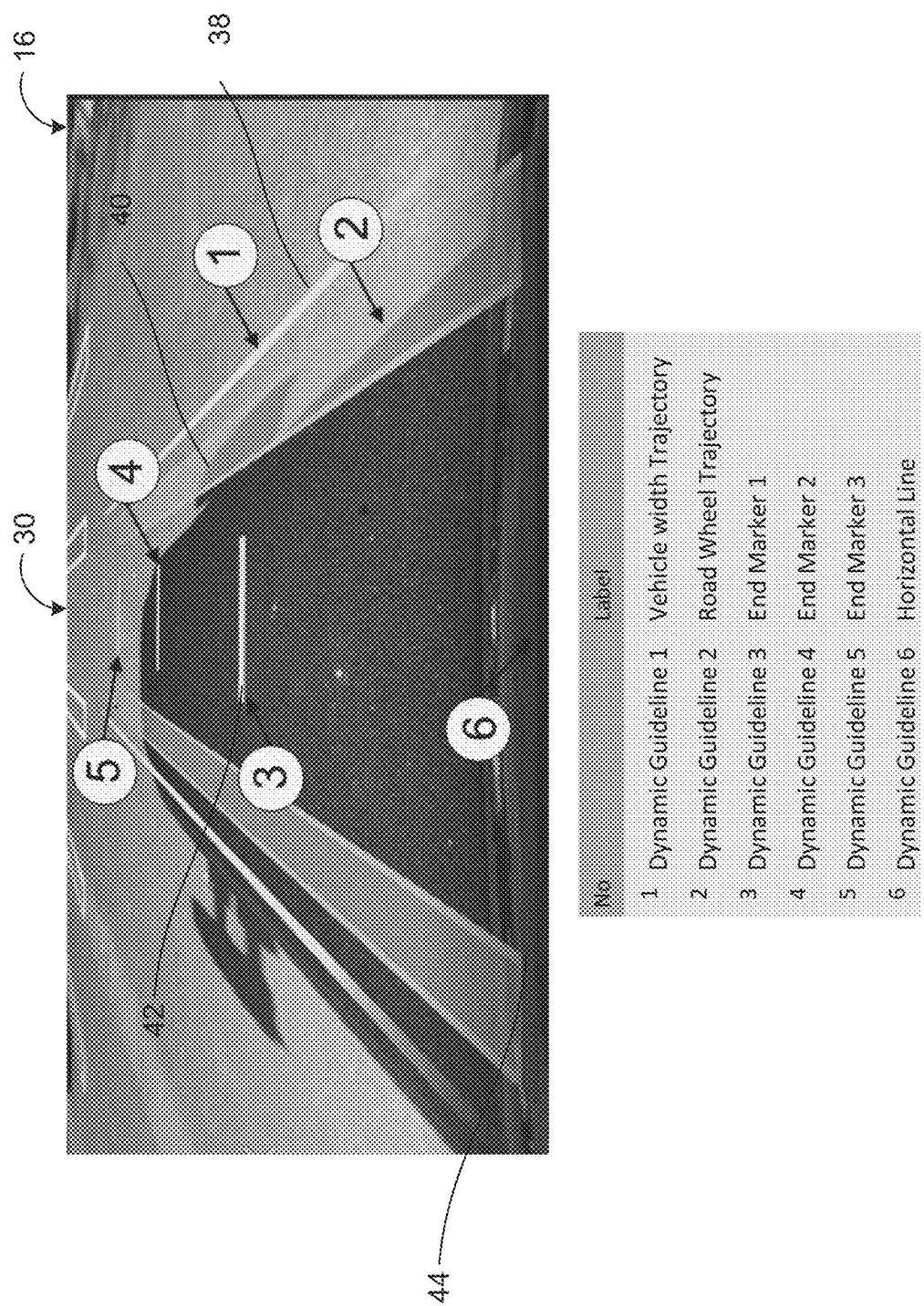
FIGS. 9 and 10 are views of video images on a video display showing a graphical overlay that includes a dynamic guideline overlaid on a view forward of the vehicle.
Figure 10:
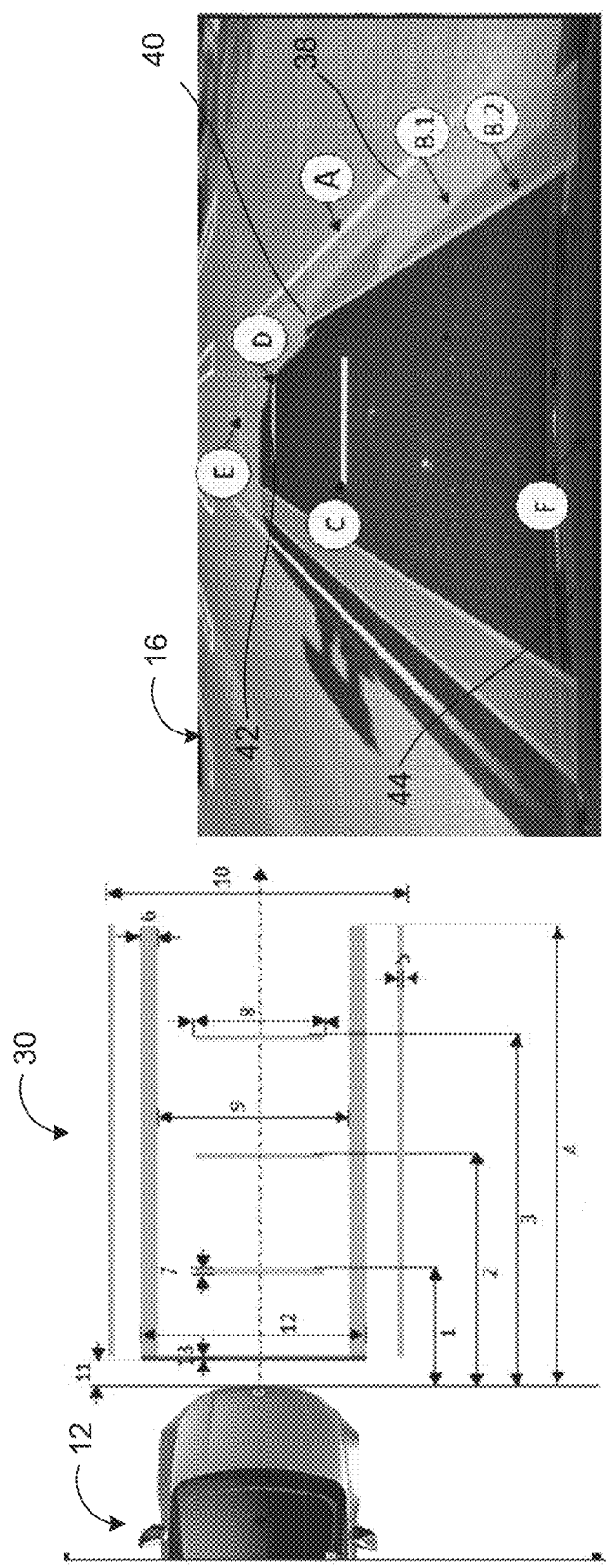
Figure 11:
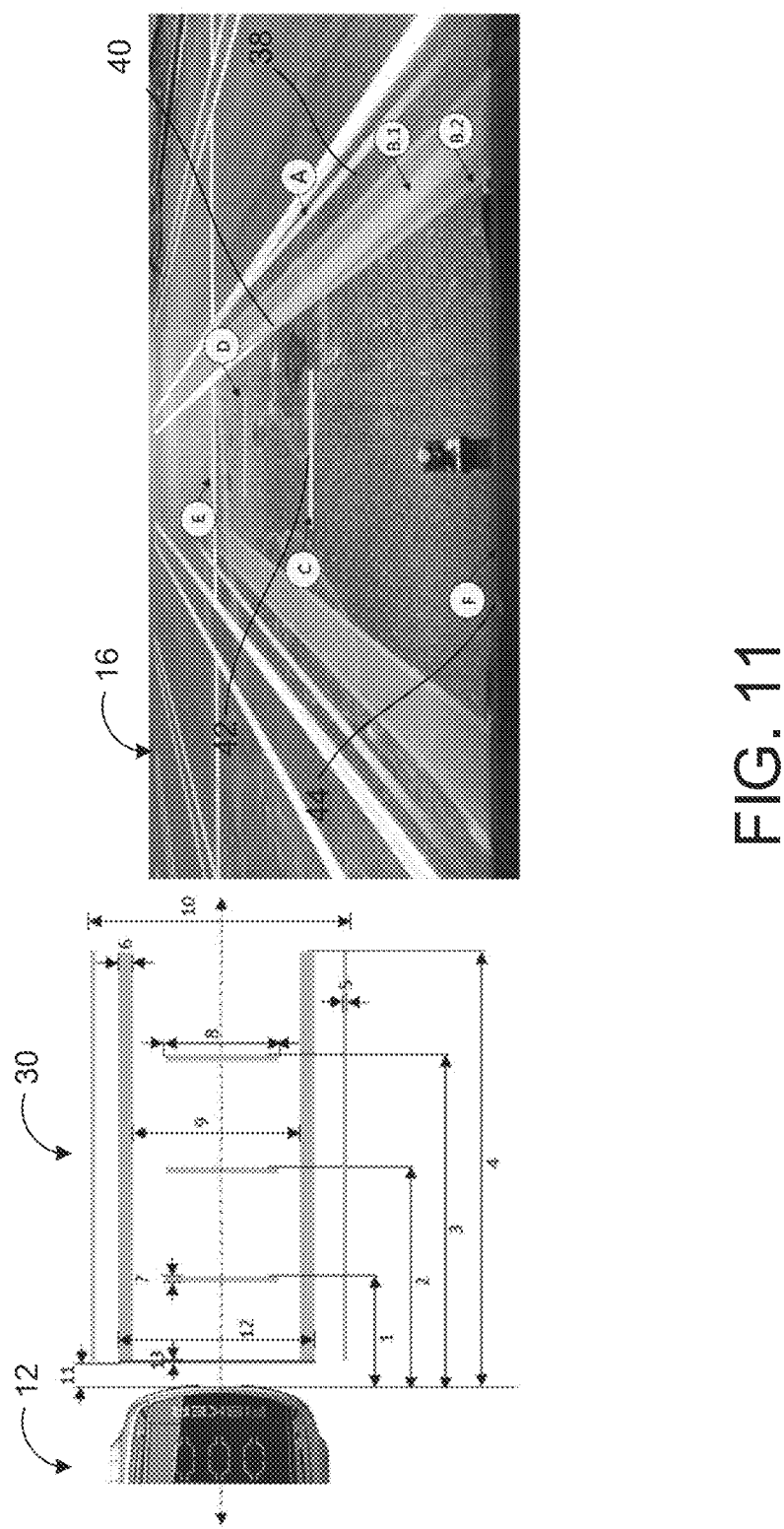
FIG. 11 is a view of a video image on a video display showing a graphical overlay that includes a dynamic guideline overlaid on a view rearward of the vehicle.

As shown in FIGS. 9-11, the graphic overlay may also include a guideline 30 representative of a path of travel of the vehicle. The guideline 30 may be dynamically adjusted based on changes in the determined path of travel or changes in the position of determined objects relative to the vehicle. In this example, the guideline 30 includes a vehicle width trajectory or outermost trajectory line 38 on opposing sides of the guideline 30 and representative of an outermost point of the vehicle on opposing sides of the vehicle along the path of travel. The guideline 30 further includes a road wheel trajectory line 40 representative of paths of the wheels of the vehicle along the path of travel of the vehicle. Additionally, the guideline 30 includes one or more marker lines 42 representative of a respective predetermined distance from the vehicle within the environment along the path of travel. For example, the marker lines 42 may be positioned at the bounds of the proximity zones. A horizontal line 44 may represent the outer edge, such as the front or rear bumper of the vehicle. FIG. 10 depicts the display 16 showing the dynamic guideline 30 overlaid onto a view forward of the vehicle (i.e., captured via a camera viewing forward of the vehicle). FIG. 11 depicts the display 16 showing the dynamic guideline 30 overlaid on to a rearward view of the vehicle (i.e., captured via a camera viewing rearward of the vehicle).

Thus, the dynamic guideline 30 is used to determine the vehicle width trajectory and the road wheel trajectory along the path of travel of the vehicle. It assists the driver in seeing the position, trajectory, and/or objects in the movement of direction. It also helps the driver in identifying the distance of objects from the vehicle with the marker lines 42. The marker lines 42 may be marked at specified distances from the vehicle. For example, the marker lines 42 coincide with the boundaries of the proximity zones. The guideline 30 may be shown at the display 16 along with, for example, the rear view and/or the front view. Dynamic guidelines can move or flex or move horizontally as the steering angle of the vehicle changes. That is, as the driver turns the steering wheel, the dynamic guidelines update to reflect the current/predicted trajectory of the vehicle based on the steering change. For example, the marker lines 42 move in a horizontal arc that tracks the steering change. FIG. 12 is a table 1200 of example dimensions and values of the dynamic graphic overlay.

Thus, the system provides a display at an interior portion of a vehicle for viewing by a driver of the vehicle. The system displays video images at the display derived from image data captured by one or more cameras at the vehicle and also displays a graphic overlay at the video images to assist the driver in understanding the position of detected objects relative to the vehicle and the path of travel of the vehicle within the environment. The system may adjust the graphic overlay based on determined changes in position of the object relative to the vehicle, such as by changing characteristics of an icon representative of the object within the environment (e.g., color, size, etc.). The system may categorize the position of the object based on the position of the object within a particular zone or distance range from the vehicle and may define or adjust characteristics of the icon based on the dynamic categorization of the object.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels, such as preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The system may utilize sensors, such as radar sensors or imaging radar sensors or lidar sensors or the like, to detect presence of and/or range to other vehicles and objects. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

The system includes a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,264,672; 9,126,525 and/or 9,041,806, and/or U.S. Publication No. US-2015-0022664, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera disposed at a vehicle equipped with the vehicular vision system, the camera viewing exterior of the equipped vehicle, wherein the camera is operable to capture image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera;
   a video display disposed in the equipped vehicle and operable to display video images derived from image data captured by the camera;
   wherein, during a driving maneuver, the vehicular vision system displays video images derived from the captured image data on the video display;
   wherein, during the driving maneuver, the vehicular vision system, at least in part via processing at the ECU of image data captured by the camera, detects an object present exterior of the equipped vehicle;
   wherein the vehicular vision system, responsive to detecting the object present exterior of the equipped vehicle, determines location of the detected object relative to the equipped vehicle and determines a portion of the detected object that is closest to the equipped vehicle;
   wherein the vehicular vision system generates a graphic overlay, and wherein the graphic overlay comprises a three-dimensional (3D) icon, and wherein the 3D icon comprises a width and a height defining a front face of the 3D icon, and wherein the 3D icon comprises a rear face opposing the front face, and wherein the 3D icon has a length dimension between the front face and the rear face;
   wherein the vehicular vision system displays the graphic overlay with the displayed video images on the video display;
   wherein the 3D icon overlays the portion of the detected object that is closest to the equipped vehicle;
   wherein the front face of the overlaid 3D icon faces toward a representation of the equipped vehicle displayed on the video display; and
   wherein the vehicular vision system, responsive to determining a change in location of the detected object relative to the equipped vehicle, adjusts the length dimension of the 3D icon overlaid at the portion of the detected object based on the determined change in location of the detected object, and wherein the length dimension of the 3D icon decreases as the distance between the detected object and the equipped vehicle decreases.

2. The vehicular vision system of claim 1, wherein the 3D icon comprises a cuboid.

3. The vehicular vision system of claim 1, wherein the vehicular vision system adjusts two or more characteristics of the 3D icon based on the determined change in location of the detected object relative to the equipped vehicle.

4. The vehicular vision system of claim 3, wherein the vehicular vision system adjusts the height or the width of the 3D icon based on the determined change in location of the detected object relative to the equipped vehicle.

5. The vehicular vision system of claim 3, wherein the vehicular vision system adjusts a color of the 3D icon based on the determined change in location of the detected object relative to the equipped vehicle.

6. The vehicular vision system of claim 1, wherein the vehicular vision system determines the location of the detected object relative to the equipped vehicle within one of a plurality of zones, wherein each zone of the plurality of zones represents a range of distances relative to the equipped vehicle.

7. The vehicular vision system of claim 6, wherein a size of the plurality of zones is based on a speed of the equipped vehicle.

8. The vehicular vision system of claim 6, wherein the vehicular vision system adjusts the graphic overlay based on a determination that the location of the detected object has moved from a first one of the plurality of zones to a second one of the plurality of zones.

9. The vehicular vision system of claim 1, wherein the graphic overlay comprises a guideline representative of a path of travel of the equipped vehicle.

10. The vehicular vision system of claim 9, wherein the vehicular vision system adjusts the guideline based on a determined change in the path of travel of the equipped vehicle.

11. The vehicular vision system of claim 9, wherein the guideline comprises a wheel trajectory line representative of a path of a wheel of the equipped vehicle along the path of travel of the equipped vehicle.

12. The vehicular vision system of claim 9, wherein the guideline comprises an outermost trajectory line representative of a path of an outermost point of the equipped vehicle along the path of travel of the equipped vehicle.

13. The vehicular vision system of claim 9, wherein the guideline comprises one or more marker lines, wherein each marker line of the one or more marker lines is representative of a respective predetermined distance from the equipped vehicle within the environment along the path of travel of the equipped vehicle.

14. The vehicular vision system of claim 1, wherein the driving maneuver comprises one selected from the group consisting of (i) a forward driving maneuver or (ii) a reverse driving maneuver.

15. The vehicular vision system of claim 1, wherein the driving maneuver comprises a parking maneuver.

16. The vehicular vision system of claim 1, wherein the representation of the equipped vehicle displayed on the video display comprises an avatar of the equipped vehicle displayed on the video display.

17. The vehicular vision system of claim 1, wherein the representation of the equipped vehicle displayed on the video display comprises displayed video images of at least a portion of the equipped vehicle derived from the image data captured by the camera.

18. A vehicular vision system, the vehicular vision system comprising:
    a camera disposed at a vehicle equipped with the vehicular vision system, the camera viewing exterior of the equipped vehicle, wherein the camera is operable to capture image data;
    wherein the camera comprises a CMOS imaging array, and wherein the CMOS imaging array comprises at least one million photosensors arranged in rows and columns;
    an electronic control unit (ECU) comprising electronic circuitry and associated software;
    wherein the electronic circuitry of the ECU comprises an image processor for processing image data captured by the camera;
    a video display disposed in the equipped vehicle and operable to display video images derived from image data captured by the camera;
    wherein, during a driving maneuver, the vehicular vision system displays video images derived from the captured image data on the video display;
    wherein, during the driving maneuver, the vehicular vision system, at least in part via processing at the ECU of image data captured by the camera, detects an object present exterior of the equipped vehicle;
    wherein the vehicular vision system, responsive to detecting the object present exterior of the equipped vehicle, determines location of the detected object relative to the equipped vehicle and determines a portion of the detected object that is closest to the equipped vehicle;
    wherein the vehicular vision system generates a graphic overlay, and wherein the graphic overlay comprises a cuboid icon, and wherein the cuboid icon comprises a width and a height defining a front face of the cuboid icon, and wherein the cuboid icon comprises a rear face opposing the front face, and wherein the cuboid icon has a length dimension between the front face and the rear face;
    wherein the vehicular vision system displays the graphic overlay with the displayed video images on the video display;
    wherein the cuboid icon overlays the portion of the detected object that is closest to the equipped vehicle;
    wherein the front face of the overlaid cuboid icon faces toward a representation of the equipped vehicle displayed on the video display;
    wherein, responsive to determining that the distance between the portion of the detected object that is closest to the equipped vehicle and the equipped vehicle decreases, the vehicular vision system decreases the length dimension of the cuboid icon overlaid at the portion of the detected object; and
    wherein, responsive to determining that the distance between the portion of the detected object that is closest to the equipped vehicle and the equipped vehicle increases, the vehicular vision system increases the length dimension of the cuboid icon overlaid at the portion of the detected object.

19. The vehicular vision system of claim 18, wherein the vehicular vision system adjusts two or more characteristics of the cuboid icon based on the determined change in location of the detected object relative to the equipped vehicle.

20. The vehicular vision system of claim 19, wherein the vehicular vision system adjusts the height or the width of the cuboid icon based on the determined change in location of the detected object relative to the equipped vehicle.

21. The vehicular vision system of claim 19, wherein the vehicular vision system adjusts a color of the cuboid icon based on the determined change in location of the detected object relative to the equipped vehicle.

22. A vehicular vision system, the vehicular vision system comprising:
    a camera disposed at a vehicle equipped with the vehicular vision system, the camera viewing exterior of the equipped vehicle, wherein the camera is operable to capture image data;
    wherein the camera comprises a CMOS imaging array, and wherein the CMOS imaging array comprises at least one million photosensors arranged in rows and columns;
    an electronic control unit (ECU) comprising electronic circuitry and associated software;
    wherein the electronic circuitry of the ECU comprises an image processor for processing image data captured by the camera;
    a video display disposed in the equipped vehicle and operable to display video images derived from image data captured by the camera;
    wherein, during a driving maneuver, the vehicular vision system displays video images derived from the captured image data on the video display;
    wherein, during the driving maneuver, the vehicular vision system, at least in part via processing at the ECU of image data captured by the camera, detects an object present exterior of the equipped vehicle;
    wherein the vehicular vision system, responsive to detecting the object present exterior of the equipped vehicle, determines location of the detected object relative to the equipped vehicle and determines a portion of the detected object that is closest to the equipped vehicle;
    wherein the vehicular vision system generates a graphic overlay, and wherein the graphic overlay comprises a three-dimensional (3D) icon, and wherein the 3D icon comprises a width and a height defining a front face of the 3D icon, and wherein the 3D icon comprises a rear face opposing the front face, and wherein the 3D icon has a length dimension between the front face and the rear face;
    wherein the vehicular vision system displays the graphic overlay with the displayed video images on the video display;
    wherein the 3D icon overlays the portion of the detected object that is closest to the equipped vehicle;
    wherein the front face of the overlaid 3D icon faces toward a representation of the equipped vehicle displayed on the video display;
    wherein the vehicular vision system determines the location of the detected object relative to the equipped vehicle within one of a plurality of zones, and wherein each zone of the plurality of zones represents a range of distances relative to the equipped vehicle;
    wherein the vehicular vision system, responsive to determining a change in location of the detected object from a distal first zone of the plurality of zones to a proximal second zone of the plurality of zones, adjusts the length dimension of the 3D icon overlaid at the portion of the detected object based on the determined change in zones;

wherein the vehicular vision system, responsive to determining the detected object has changed in location from the distal first zone to the proximal second zone, decreases the length dimension of the 3D; and wherein the vehicular vision system adjusts a color of the 3D icon based on the determined change in zones.

23. The vehicular vision system of claim 22, wherein a size of the plurality of zones is based on a speed of the equipped vehicle.

24. The vehicular vision system of claim 22, wherein the graphic overlay comprises a guideline representative of a path of travel of the equipped vehicle.

25. The vehicular vision system of claim 24, wherein the guideline comprises one or more marker lines, wherein each marker line of the one or more marker lines is representative of a respective zone of the plurality of zones.

\* \* \* \* \*